US012443790B2

(12) United States Patent
Nair et al.

(10) Patent No.: US 12,443,790 B2
(45) Date of Patent: Oct. 14, 2025

(54) REFLOWING INFOGRAPHICS FOR CROSS-DEVICE DISPLAY

(71) Applicant: Adobe Inc., San Jose, CA (US)

(72) Inventors: Inderjeet Nair, Bengaluru (IN); Niyati Himanshu Chhaya, Hyderabad (IN); Sumit Shekhar, Bengaluru (IN); Mohar Kundu, Kolkata (IN); Lakshya Jagadish, Bengaluru (IN); Aravind Veluri, Hyderabad (IN); Anirudh Phukan, Bengaluru (IN); Akhash Amarnath, Chennai (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/446,765

(22) Filed: Aug. 9, 2023

(65) Prior Publication Data
US 2025/0053734 A1   Feb. 13, 2025

(51) Int. Cl.
*G06F 3/048* (2013.01)
*G06F 40/106* (2020.01)
(Continued)

(52) U.S. Cl.
CPC .......... *G06F 40/186* (2020.01); *G06F 40/106* (2020.01); *G06V 30/1448* (2022.01);
(Continued)

(58) Field of Classification Search
CPC . G06F 40/186; G06F 40/106; G06V 30/1448; G06V 30/148; G06V 30/191; G06V 30/414; G06V 30/416
See application file for complete search history.

(56) References Cited

U.S. PATENT DOCUMENTS

| 8,249,356 B1 * | 8/2012 | Smith ................. G06V 30/414 382/199 |
| 2003/0014445 A1 * | 1/2003 | Formanek ............ G06F 40/103 707/E17.121 |

(Continued)

FOREIGN PATENT DOCUMENTS

| CN | 115063823 A * | 9/2022 | ............. G06V 30/15 |
| JP | 3940491 B2 * | 7/2007 | |

OTHER PUBLICATIONS

Bylinskii et al., "Understanding Infographics through Textual and Visual Tag Prediction," arXiv:1709.09215v1 [cs.CV], Sep. 26, 2017, pp. 1-11.

(Continued)

*Primary Examiner* — Rashawn N Tillery
(74) *Attorney, Agent, or Firm* — Nicholson De Vos Webster & Elliott LLP

(57) ABSTRACT

Embodiments are disclosed for reflowing an infographic image for display in a mobile device using machine learning models. In particular, in one or more embodiments, the method may include receiving a document for display in a user device, the document including an infographic image. The method may further include identifying, using a convolutional neural network, visual components of the infographic image. The method may further include determining, using an encoder-decoder network, an ordered sequence of the identified visual components. A generative adversarial network then generates a modified visual representation of the infographic image based on the identified visual components and the determined ordered sequence of the identified visual components. The modified visual of representation of the infographic image is then presented for display in a viewing pane of a user device in place of the infographic image.

20 Claims, 11 Drawing Sheets
(1 of 11 Drawing Sheet(s) Filed in Color)

(51) Int. Cl.
*G06F 40/186* (2020.01)
*G06V 30/14* (2022.01)
*G06V 30/148* (2022.01)
*G06V 30/19* (2022.01)
*G06V 30/414* (2022.01)
*G06V 30/416* (2022.01)

(52) U.S. Cl.
CPC .......... *G06V 30/148* (2022.01); *G06V 30/191* (2022.01); *G06V 30/414* (2022.01); *G06V 30/416* (2022.01)

(56) References Cited

U.S. PATENT DOCUMENTS

| | | | | |
|---|---|---|---|---|
| 2004/0114813 A1* | 6/2004 | Boliek | ................ | G06V 30/414 375/E7.199 |
| 2004/0205568 A1* | 10/2004 | Breuel | ................ | G06F 40/166 715/205 |
| 2006/0288278 A1* | 12/2006 | Kobayashi | ............ | G06F 40/154 715/209 |
| 2008/0215985 A1* | 9/2008 | Batchelder | ............ | G06F 40/103 715/201 |
| 2010/0088605 A1* | 4/2010 | Livshin | ................ | G06Q 10/00 715/731 |
| 2012/0128249 A1* | 5/2012 | Panjwani | ............ | G06V 30/416 382/177 |
| 2014/0212038 A1* | 7/2014 | Dejean | ................ | G06V 30/414 382/229 |
| 2014/0337719 A1* | 11/2014 | Xu | ........................ | G06F 3/0484 715/255 |
| 2015/0046797 A1* | 2/2015 | Li | ........................ | G06F 40/151 715/249 |
| 2015/0242374 A1* | 8/2015 | Kong | .................... | G06F 40/106 715/201 |
| 2016/0170941 A1* | 6/2016 | Waterfall | .............. | G06F 40/151 715/234 |
| 2017/0212870 A1* | 7/2017 | Thomsen | .............. | G06F 40/106 |
| 2018/0046708 A1* | 2/2018 | Stewart | ................ | G06V 10/762 |
| 2020/0311185 A1* | 10/2020 | Agrawal | .............. | G06F 40/103 |
| 2021/0406619 A1* | 12/2021 | Lv | ........................ | G06N 3/045 |
| 2022/0019735 A1* | 1/2022 | Shekhar | ............ | G06F 16/9538 |
| 2022/0036063 A1* | 2/2022 | Bhuyan | ................ | G06V 30/416 |
| 2022/0156446 A1* | 5/2022 | Juhl | ........................ | G06F 40/131 |
| 2023/0153531 A1* | 5/2023 | Geng | .................... | G06N 3/084 704/9 |

OTHER PUBLICATIONS

Kikuchi et al., "Constrained Graphic Layout Generation via Latent Optimization," Proceedings of the 29th ACM International Conference on Multimedia (MM '21), Oct. 17, 2021, pp. 88-96.

Lee et al., "Perceptions of using infographics for scientific communication on social media for COVID-19 topics: a survey study," Journal of Visual Communication in Medicine, Mar. 28, 2022, pp. 1-10.

Li et al., "LayoutGAN: Generating Graphic Layouts with Wireframe Discriminators," arXiv:1901.06767v1 [cs.CV], Jan. 21, 2019, pp. 1-16.

Lu et al., "Exploring Visual Information Flows in Infographics," Proceedings of the 2020 CHI Conference on Human Factors in Computing Systems (CHI '20), Apr. 23, 2020, pp. 1-12.

Wang et al., "LayoutReader: Pre-training of Text and Layout for Reading Order Detection," arXiv:2108.11591v2 [cs.CL], Aug. 27, 2021, pp. 1-10.

* cited by examiner

REFLOWING INFOGRAPHICS FOR CROSS-DEVICE DISPLAY

BACKGROUND

Mobile devices allow users to perform tasks on handheld devices, such as smartphones, that would typically be performed on other devices, such as desktop and laptop computers. This includes the viewing of documents that can include a mixture of text, images, and other graphics. However, viewing such documents in smaller devices can be difficult, as the user may have to constantly zoom in and out of the document and scroll horizontally or vertically to view all the text in the document. To address this issue, tools were developed that allow documents to be reflowed such that text can be rearranged to fit the viewing window of a device. For example, to fit within the width of the viewing window of a device, multi-column text in a document can be rearranged into a single text column and the size of text and images can be modified.

SUMMARY

Introduced here are techniques/technologies that allow a digital design system to extract components and their reading order from an infographic image and then reflow the component into a layout that can be consumed on different devices, such as mobile devices.

In particular, in one or more embodiments, a digital design system processes an infographic image through a pipeline of machine learning models. The infographic image is first analyzed to identify the components of the infographic image. For example, the components can include a title of the infographic, text included within infographic elements (e.g., boxes), icons, etc. The components can be identified using an object detection machine learning model and an image segmentation algorithm, Once identified, the components are then processed through an order detection machine learning model to identify a reading order, or ordered sequence, of the components. For example, the order detection machine learning model can assign a sequence index to each of the components indicating their order within the infographic image. The determined reading order and the components are then provided to a layout generator that is configured to reflow or reorganize the components in the infographic into a new layout suitable for display in a device (e.g., a mobile device).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
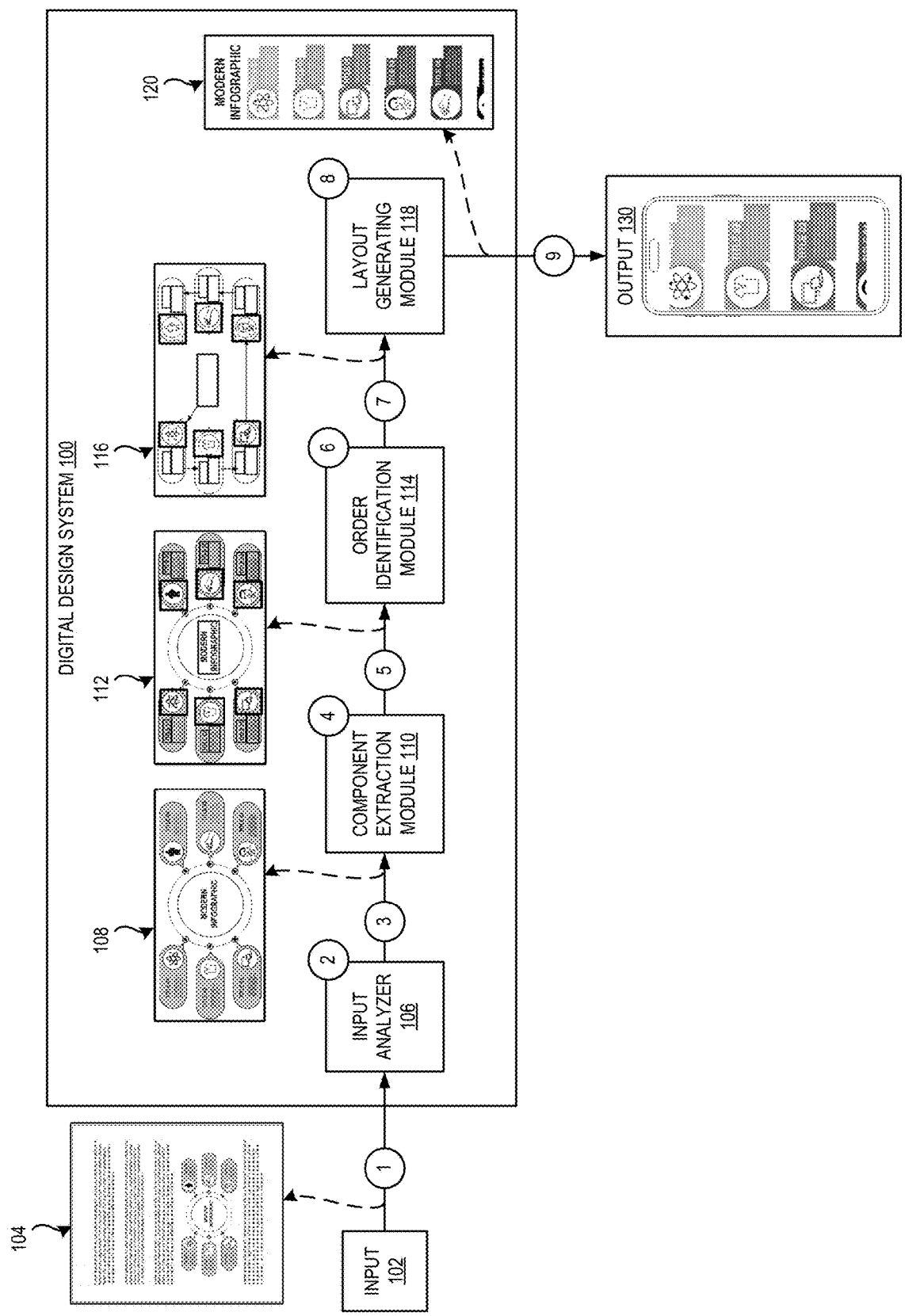
FIG. 1 illustrates a diagram of a process of re-flowing components of an infographic image for display in a device in accordance with one or more embodiments.

One or more embodiments of the present disclosure include a digital design system that reflows or reorganizes the components/elements of an infographic image into a linear layout that makes it easier to display the infographic image on mobile devices, allowing users to view the components of the infographic image without the need to zoom in/out manually. Infographics are comprehensive, understandable visual representations of quantitative and qualitative data. Infographic typically include a number of components (e.g., text boxes with associated icons, images, etc.) displaying such data in an intended reading order. Information from academic, scientific, and infomercial sources can be retained and digested using infographics as a medium. To reflow an infographic image, the digital design system extracts components and their reading order from an infographic image and reformats the components into a linear format that better conforms to the viewing window of a device.

One conventional approach for handling the display of a document in different types of devices is to modify the document by reformatting headings, paragraphs, and images to create a better flow for mobile viewing. This approach is suitable for text and the display of images as their sizes can be adjusted to fit the device they are being accessed on. However, this approach is inadequate for dealing with infographic images that can include diverse content, including titles, text, and icons. In many cases, resizing infographic images to fit within the dimensions of the viewing window of a device can render any text included within the infographic image illegible unless a user manually zooms in on the infographic image, which can result in a poor consumption experience.

To address these and other deficiencies in conventional systems, the digital design system reflows an infographic image into a new layout to allow the information in the infographic image to be read from a mobile device without requiring a user to manually zoom in. For example, an infographic image may describe an ordered series of steps through a visual arrangement of text boxes. The digital design system uses an object detection model and an image segmentation algorithm to identify the relevant components of the infographic image, including text, images, and icons. An encoder-decoder network then determines the reading order of the components, and the components are reflowed (e.g., into a linear organization) that is better suited for display in device (e.g., a mobile device).

The digital design system of the present disclosure improves the display of infographic images in mobile devices. For example, an infographic image with components that are organized in multiple directions across and down the infographic image, once processed through the digital design system, can be reflowed into a new layout that is ideal for display within the viewing window of mobile devices, while providing readability and eliminating the need for a user to zoom in or out and/or scroll across the infographic image. The process of reflowing infographic images into a new layout performed by the digital design system of the present disclosure can also be used in other situations, such as to re-render an existing infographic image for a web application where the original assets may not be available.

FIG. 1 illustrates a diagram of a process of re-flowing components of an infographic image for display in a device in accordance with one or more embodiments. As shown in FIG. 1, a digital design system 100 receives an input 102, as shown at numeral 1. For example, the digital design system 100 receives the input 102 from a user via a computing device or from a memory or storage location. In one or more embodiments, the input 102 includes at least a document (e.g., document 104). In one or more embodiments, the input 102 can be provided in a graphical user interface (GUI).

As illustrated in FIG. 1, the digital design system 100 includes an input analyzer 106 that receives the input 102. In some embodiments, the input analyzer 106 analyzes the input 102, as shown at numeral 2. In some embodiments, the input analyzer 106 analyzes the input 102 to identify document 104. In one or more embodiments, the document 104 can be in one of a plurality of different formats. The document 104 can include one or more infographic images, as shown in FIG. 1, that are identifiable by the input analyzer 106. For example, the input analyzer 106 identifies one or more infographic images (e.g., infographic image 108) in the content of document 104. In one or more embodiments, the input analyzer 106 is configured, or trained, to identify images in a document and generate captions for each identified image. In such embodiments, an infographic image can be identified based on the caption generated.

In one or more embodiments, the input 102 can also include specifications for a computing device (e.g., a mobile device) viewing the document 104. In such embodiments, the digital design system 100 can perform the process described in FIG. 1 in real-time based on the document 104 and the specifications for the computing device.

Figure 2:
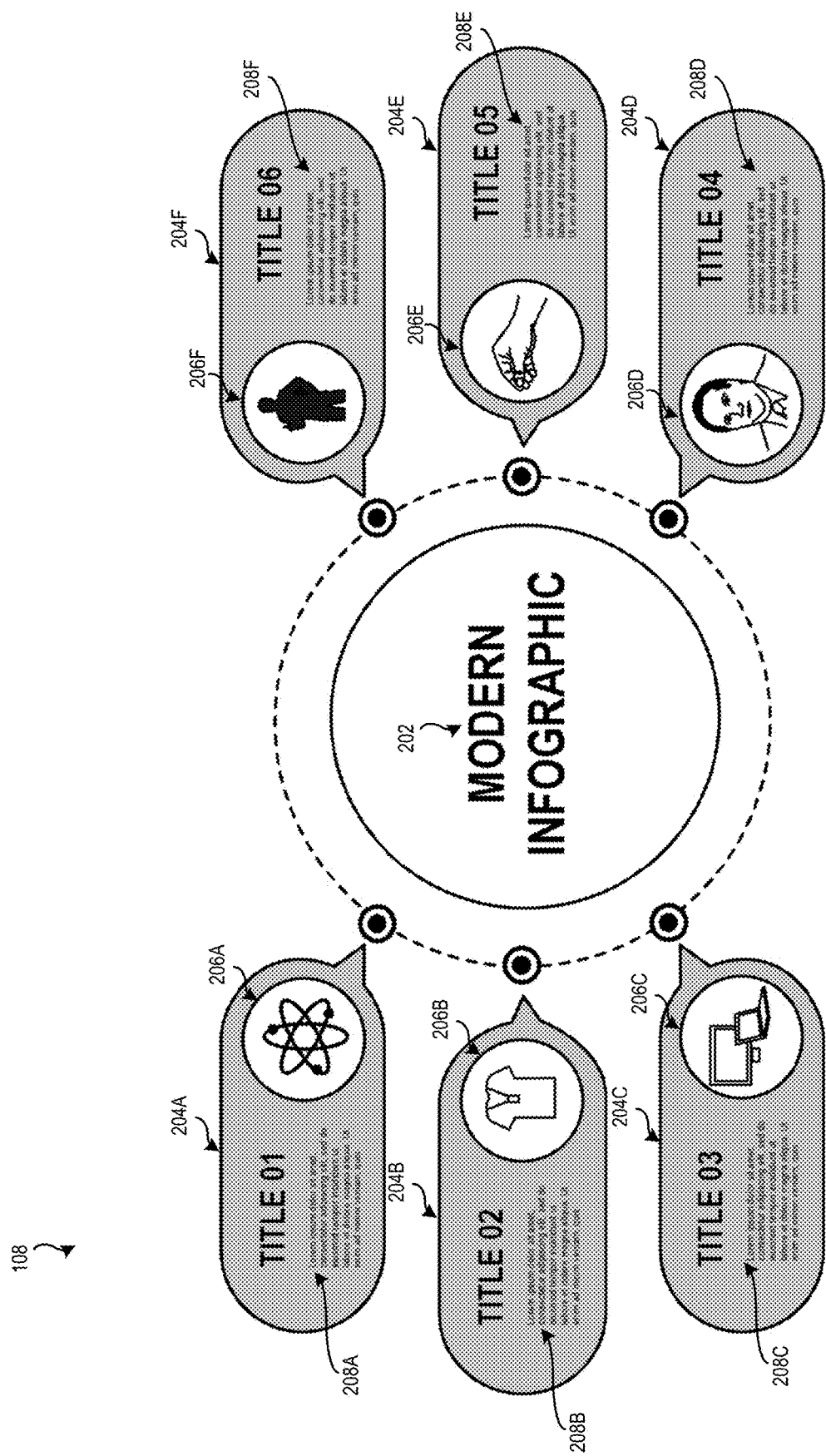
FIG. 2 illustrates an example infographic image in accordance with one or more embodiments.

FIG. 2 illustrates an example infographic image in accordance with one or more embodiments. The infographic image 108 is extracted from an input (e.g., document 104) by an input analyzer (e.g., input analyzer 106). The infographic image 108 includes title text 202 and is surrounded by a plurality of infographic objects 204A-F. The plurality of infographic objects 204A-F are each associated with icons (e.g., icons 206A-F) and object text (e.g., object text 208A-F). The plurality of infographic objects 204A-F can be organized and designed to be read in a particular order.

Returning to FIG. 1, after the input analyzer 106 analyzes the input 102 to identify the infographic image 108, the infographic image 108 is sent to a component extraction module 110, as shown at numeral 3. In one or more embodiments, the component extraction module 110 is configured to extract visual components 112 from the infographic image 108, at numeral 4. In one or more embodiments, the component extraction module 110 extracts the visual components 112 via a two-stage process. The first stage of the component extraction module 110 uses a convolutional neural network (CNN) object detector to infer the bounding box coordinates of candidate elements in the infographic image 108, where candidate elements can include an infographic title, text boxes, icons, etc. In one or more embodiments, the CNN object detector is YOLO-v5. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the digital design system are discussed below with respect to FIGS. 3-7.

In one or more embodiments, the second stage of the component extraction module 110 uses an image segmentation algorithm to determine the components, which may not have rectangular boundaries. In one or more embodiments, the image segmentation algorithm is Felzenszwalb's algorithm. The candidate elements identified by the CNN object detector and the components identified by the image segmentation algorithm are used to determine the visual components of the infographic image 108.

Figure 3:
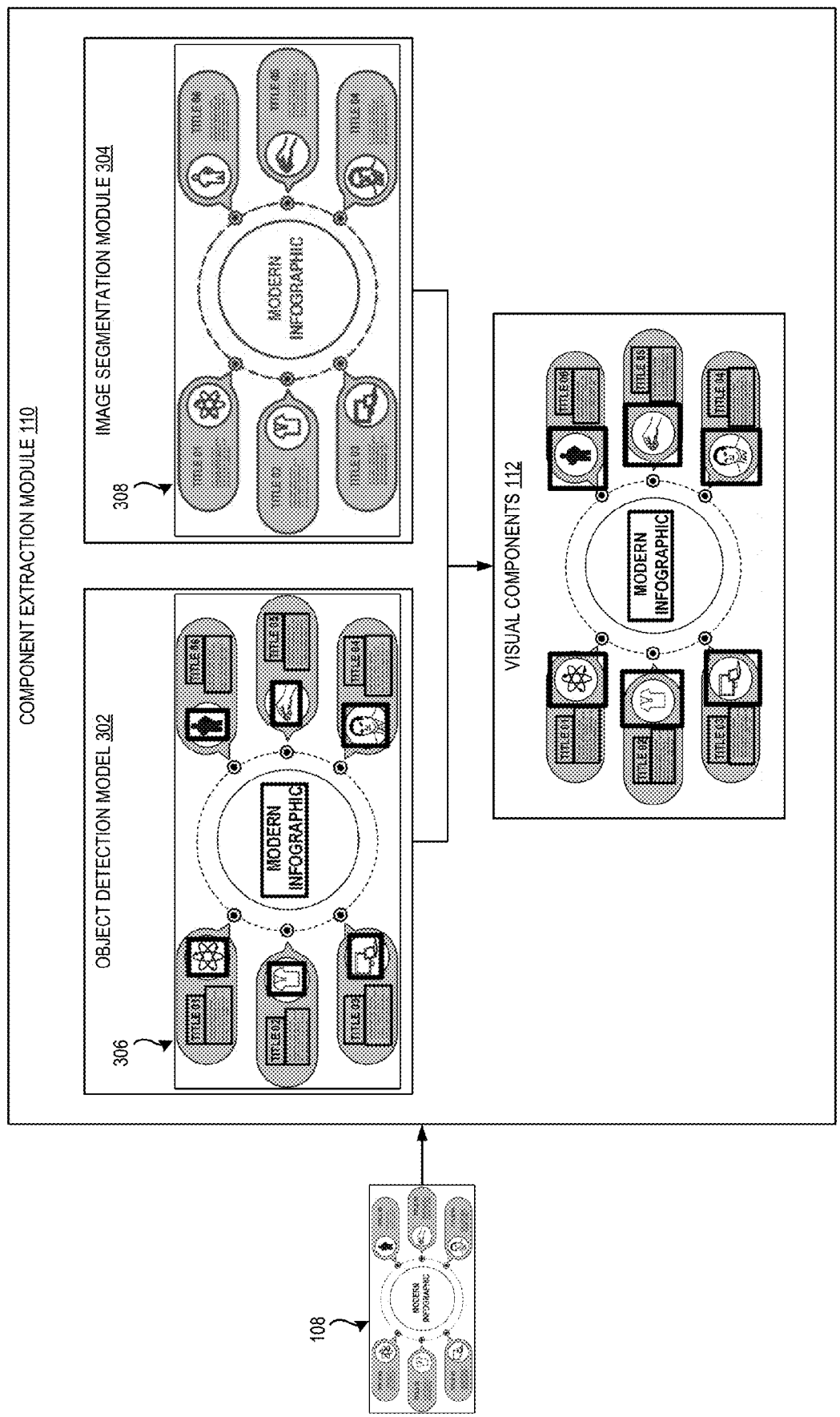
FIG. 3 illustrates an example process of extracting visual components of an infographic image in accordance with one or more embodiments.

FIG. 3 illustrates an example process of extracting visual components of an infographic image in accordance with one or more embodiments. As shown in FIG. 3, the infographic image 108 (e.g., shown in FIG. 2) is provided to the component extraction module 110 to extract the candidate elements from the infographic image 108. The infographic can be fed to an object detection model 302 and an image segmentation module 304, either sequentially or in parallel.

In one or more embodiments, the object detection model 302 is a convolutional neural network (CNN) object detector trained to infer the bounding box coordinates of candidate elements present in the infographic image 108. In one or more embodiments, the CNN object detector used is YOLO-v5. Object detection model output 306 illustrates the candidate elements identified by the object detection model 302. While FIG. 3 depicts the object detection model output 306 visually, in one or more embodiments, the object detection model output 306 is a listing of bounding boxes of the candidate elements. In one or more embodiments, the object detection model output 306 from the object detection model 302 indicates the coordinates of each bounding box and a corresponding object type associated with the bounding box. For example, the bounding box for each candidate element can be labeled as a title, a text box, an icon, a number, etc.

In one or more embodiments, while the object detection model 302 may be accurate in detecting the various elements in an infographic, it uses bounding box coordinates to localize the elements which may not be sufficient to capture elements having arbitrary shapes/boundaries. For instance, the object detection model 302 may not be capable of extracting the complete components that encapsulate textboxes and their corresponding icons in the infographic image 108 and/or may not fully extract shapes that are more complex than rectangular. For example, while the object detection model 302 identified the shapes within the icons 206A-F and the object text 208A-F, the object detection model 302 did not identify the infographic objects 204A-F or the full icons 206A-F.

In one or more embodiments, the image segmentation module 304 is configured to divide the infographic image 108 into components using an image segmentation algorithm. In some embodiments, the image segmentation module 304 uses a graph-based image segmentation algorithm called Felzenszwalb's Algorithm to identify arbitrary shapes within the infographic image 108. In such embodiments, Felzenszwalb's Algorithm initially segments the infographic image into as many components as the number of pixels in the infographic image 108. The algorithm then iteratively merges components based on some criteria and terminates when no further merges are possible. In one or more embodiments, in each iteration, the algorithm finds pairs of components where the distance between the components in a pair is less the minimum of the internal distance for each of the components. This implies that these pairs of components must be merged.

In one or more embodiments, the image segmentation algorithm can capture visually important objects, regions, and groupings, which often reflect global aspects of the infographic image. The image segmentation algorithm is also efficient, as its time complexity is linear with the number of the pixels of the infographic image. Image segmentation module output 308 illustrates the components identified by the image segmentation module 304. As illustrated by the red outlining in FIG. 3, the image segmentation module output 308 detects individual characters from the title text 202 and the object text 208F, the shapes of the border of icons 206A-F and objects in icons 206A-F, the shapes of the infographic objects 204A-F, and various line segments and shapes connecting the various infographic objects 204A-F as separate segments of the infographic image 108.

Using the object detection model output 306 and the image segmentation module output 308, the component extraction module 110 then determines the most appropriate region for every detected candidate element from the object detection model output 306. For example, for a first candidate element from the object detection model output 306, the component extraction module 110 first filters out regions from the image segmentation module output 308 whose intersection-over-union with the bounding box of the first candidate element is less than a preset threshold. In one embodiment, the intersection-over-union is 0.75. The component extraction module 110 then filters out regions from the image segmentation module output 308 whose area exceeds a certain preset multiple of the area of the first candidate element. In one embodiment, the component extraction module 110 filters out regions that are three times the area of the first candidate element. The region with the highest overlap is returned as a visual component. The component extraction module 110 performs this process for each candidate element in the object detection model output 306 to generate the visual components 112.

Returning to FIG. 1, after the component extraction module 110 extracts the visual components 112 from the infographic image 108, the visual components 112 are sent to an order identification module 114, as shown at numeral 5. The order identification module 114 is configured to reconstruct the reading order of the visual components 112 of the infographic image 108 to generate an ordered sequence of the visual components 116, at numeral 6. In one or more embodiments, the order identification module 114 is a multi-modal transformer. An example order identification module 114 is LayoutReader.

Figure 4:
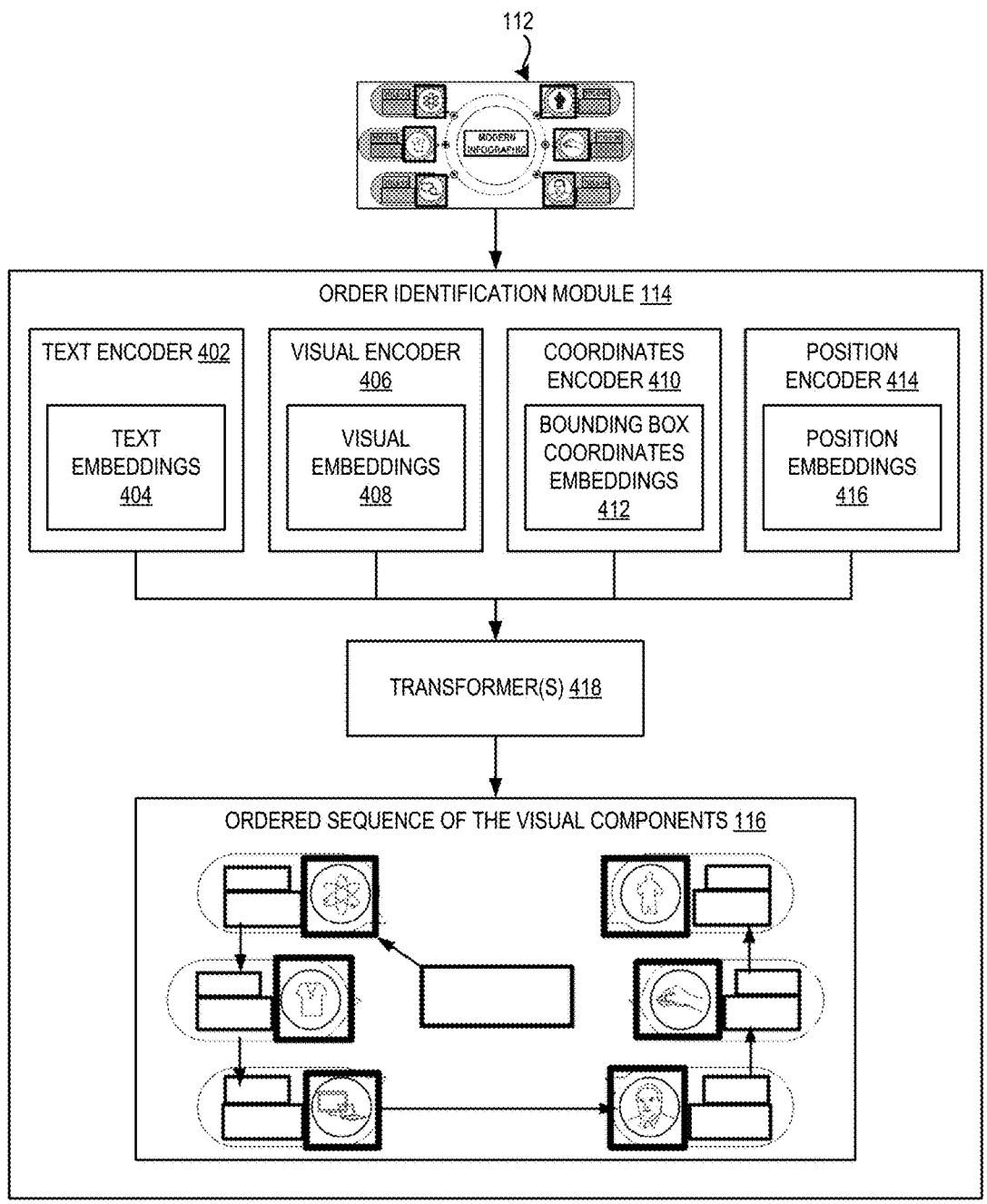
FIG. 4 illustrates an example process of determining an ordered sequence of visual components of an infographic image in accordance with one or more embodiments.

FIG. 4 illustrates an example process of determining an ordered sequence of visual components of an infographic image in accordance with one or more embodiments. In one or more embodiments, an order identification module 114 is an encoder-decoder network that includes text encoder 402, visual encoder 406, coordinates encoder 410, position encoder 414, and a transformer 418. In one or more embodiments, the order identification module 114 receives visual components 112 extracted from an infographic image 108. The visual components 112 include the text, the images (e.g., icons, etc.), and the bounding box coordinates for the text and images. Using the visual components 112, the text encoder 402 generates text embeddings 404 from the text, the visual encoder 406 generates visual embeddings 408 from the images, the coordinates encoder 410 generates bounding box coordinates embeddings 412, and the position encoder 414 generates position embeddings 416. In one or more embodiments, the transformer 418 is a multi-modal transformer trained to reconstruct the reading order of the visual components 112 extracted by the component extraction module 110. In some embodiments, the transformer 418 is LayoutReader trained with an infographic images dataset. In one or more embodiments, the transformer 418 uses a sequence-to-sequence approach where the text embeddings 404, visual embeddings 408, bounding box coordinates embeddings 412 and position embeddings 416 are provided as input for each of the visual components. The transformer 418 then generates ordered sequence of visual components 116. In one or more embodiments, the transformer 418 assigns a sequence index to each the visual components 112 to generate the ordered sequence of visual components 116. While FIG. 4 depicts the ordered sequence of visual components 116 as a series of connected boxes, the ordered sequence of visual components 116 can be a series of index numbers assigned to corresponding visual components of the visual components 112 indicating the reading order of the visual components 112.

Returning to FIG. 1, the ordered sequence of the visual components 116 are then sent to a layout generating module 118, as shown at numeral 7. The layout generating module 118 is configured to generate a modified or reflowed visual representation of the infographic image 120, at numeral 8. In some embodiments, the layout generating module 118 utilizes a data-driven generative model for layout synthesis. In other embodiments, the layout generating module 118 utilizes heuristics to arrange the visual components 112 into a plausible arrangement for display on a user device (e.g., a mobile device) using different layout templates (e.g., vertical, Z-shaped and slanting layout templates).

Figure 5:
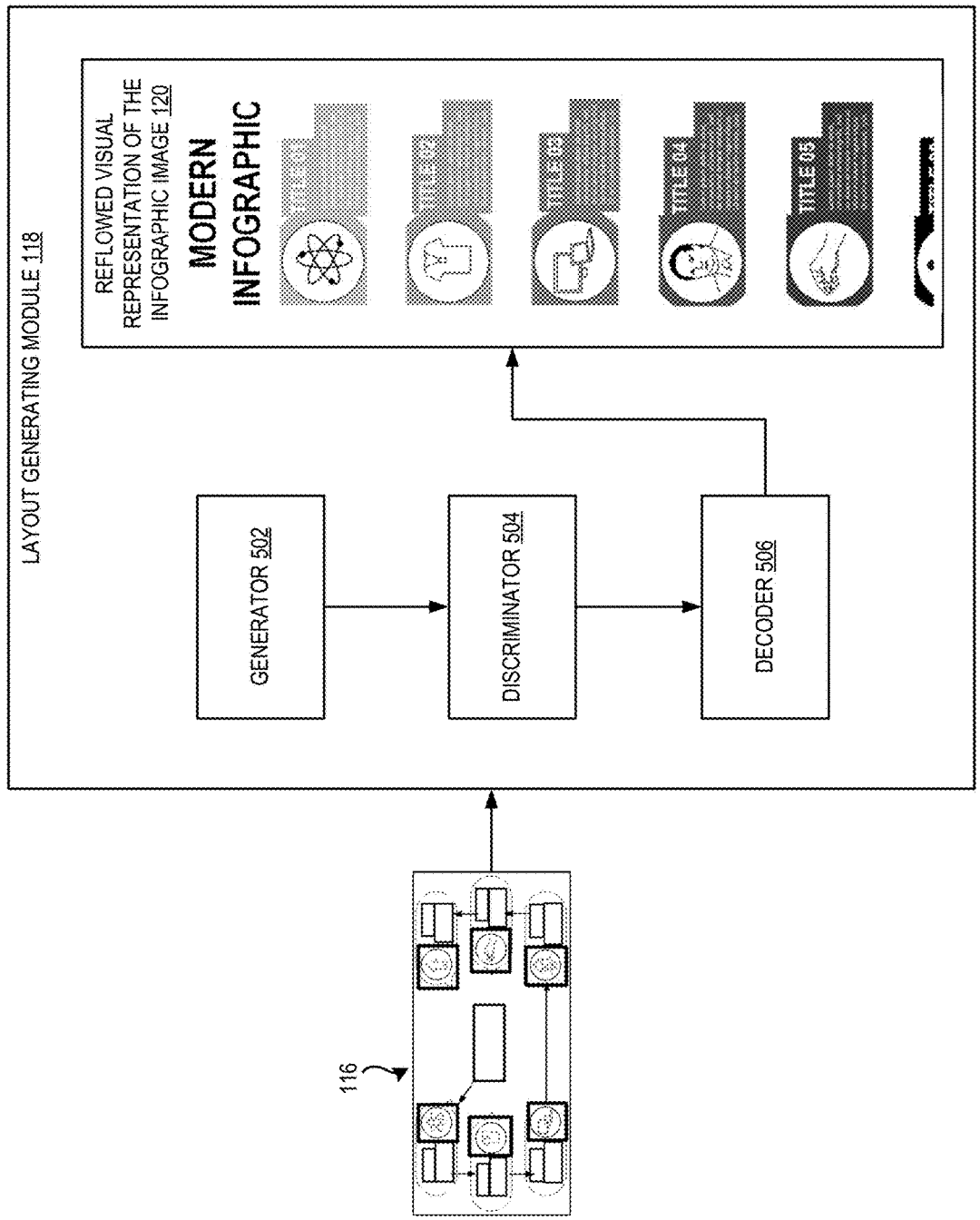
FIG. 5 illustrates an example process of generating a layout of the ordered sequence of visual components for display in a device in accordance with one or more embodiments.

FIG. 5 illustrates an example process of generating a layout of the ordered sequence of visual components for display in a device in accordance with one or more embodiments. In one or more embodiments, a layout generating module 118 includes a data-driven generative model that is used to synthesize a layout for a given ordered sequence of visual components (e.g., ordered sequence of visual components 116). In one or more embodiments, the layout generating module 118 includes a generator 502, a discriminator 504, and a decoder 506. In one or more embodiments, the generator 502 is a transformer-based generator which uses self-attention between the constituent elements and their types to generate bounding box co-ordinates for each of them. In one or more embodiments, the generator is trained over PubLayNet.

On a high level, when a noise vector is sampled from a Gaussian distribution and passed through the generator 502, the generator 502 is expected to generate a layout similar to the layouts present in the training dataset. In one or more embodiments, the layout generating module 118 uses a constrained optimization technique that utilizes several constraints such as the ordered sequence of the visual components 116 to search for the most appropriate latent code z that generates a layout which the discriminator 504 determines to be most realistic. In some embodiments, the constrained optimization technique used by the layout generating module 118 is LayoutGAN++, a generative adversarial network. Mathematically, if $\mathcal{G}$ and $\mathcal{D}$ denote the $\mathcal{G}$ generator and discriminator model, respectively, and the list of visual components associated with the infographic image is L, then the constrained optimization problem can be defined as follows:

$$\min_{z} -\mathcal{D}(\mathcal{G}(z, L))$$

$$\text{s.t. } c_n(z, L) = 0, n = 1, 2, \ldots, |C|$$

where C is a set of constraints (e.g., non-overlap, alignment, etc.) that the generated layout should follow. For example, the non-overlap constraint ensures that there is no overlap among the elements in the generated layout and the alignment metric between a pair of elements ensures that the corresponding elements are constrained to be equidistant from a certain boundary. In some embodiments, the alignment metric can be configured to ensure that the elements are equidistant from the vertical boundaries of the generated layout. To account for the reading order, an additional reading order constraint can be set so that the elements having a lower reading order index will have its bottom y-coordinate value higher than the upper y coordinate of any of the elements having a higher reading order index. In one or more embodiments, the constraints can further include the specifications for a device (e.g., mobile device) viewing the document 104, including dimensions of a viewing window of the device. In one or more embodiments, the decoder 506 acts as a rendering engine that, given the bounding box coordinates for each of the visual components 112, places the visual components 112 onto those locations and renders the final reflowed infographic. The result is the modified or reflowed visual representation of the infographic image 120. While the example in FIG. 5 depicts a single reflowed visual representation of the infographic image 120, the layout generating module 118 can generate multiple reflowed visual representation of the infographic image 120 that can be provided as output.

In an alternative approach, the layout generating module 118 uses heuristics to place the extracted components into different layouts. In one or more embodiments, the heuristics can be categorized into generating vertical, Z-shaped and slanting layout templates. Under vertical generation, the layout generating module 118 places the elements vertically with the sequence dictated by the ordered sequence of the visual components 116 inferred by the order identification module 114. For Z-shaped and slanting layouts, the layout generating module 118 place a single element in each row, but the elements are displaced horizontally so that the overall layout looks like a Z or a slant.

Returning to FIG. 1, after the layout generating module 118 generates the reflowed visual representation of the infographic image 120, the reflowed visual representation of the infographic image 120 can be sent as an output 130, as shown at numeral 9. In some embodiments, the output 130 can include one or more reflowed visual representation of the infographic images 120. In one or more embodiments, after the process described above in numerals 1-8, the output 130 is sent through a communications channel to the user device or computing device that provided the input requesting the generation of the reflowed infographic image, to another computing device associated with the user or another user, or to another system or application.

Figure 6:
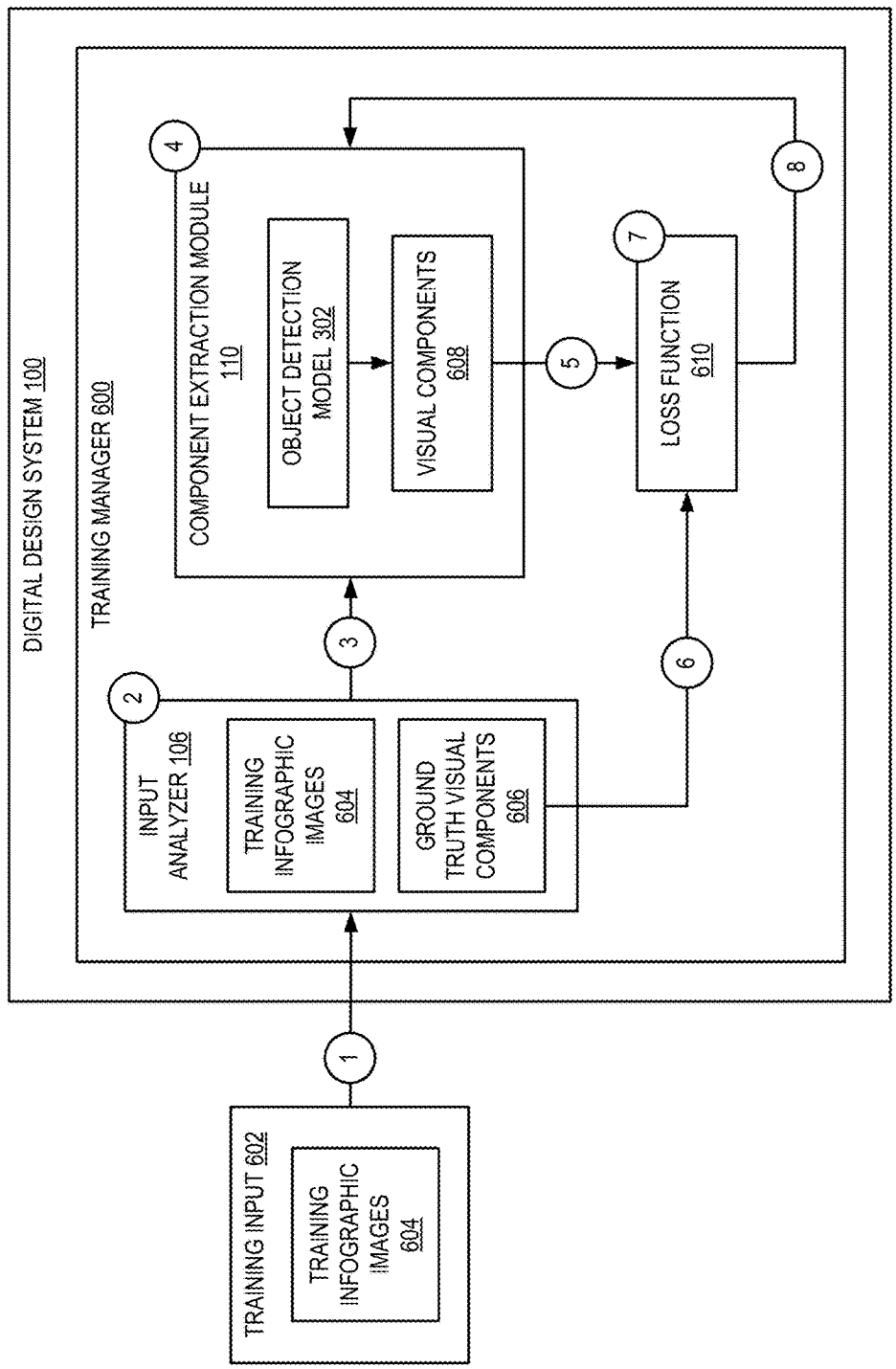
FIG. 6 illustrates a diagram of a process of training machine learning models to extract visual components of an infographic image in accordance with one or more embodiments.

FIG. 6 illustrates a diagram of a process of training machine learning models to extract visual components of an infographic image in accordance with one or more embodiments. In one or more embodiments, a training manager 600 is configured to train neural networks (e.g., component extraction module 110) to identify the components/elements of an infographic image. In some embodiments, the training manager 600 is a part of a digital design system 100. In other embodiments, the training manager 600 can be a standalone system, or part of another system, and deployed to the digital design system 100. For example, the training manager 600 may be implemented as a separate system implemented on electronic devices separate from the electronic devices implementing digital design system 100. As shown in FIG. 6, the training manager 600 receives a training input 602, as shown at numeral 1. For example, the digital design system 100 receives the training input 602 from a user via a computing device or from a memory or storage location. The training input 602 can include multiple training infographic images 604 that can be fed to the training manager 600 in parallel or in series.

In one or more embodiments, the digital design system 100 is trained using a real-world dataset and a curated dataset. In one or more embodiments, the real-world dataset is Info Visual Information Flow (InfoVIF) dataset that includes annotations for text elements, icons, and numbers. In some embodiments, the real-world dataset does not include annotations indicating reading order of the elements in corresponding infographic images. In one or more embodiments, the curated dataset is generated through a curation pipeline that includes two stages: generation of infographic and utilization of its metadata for rich annotation of element locations and reading order. Each infographic image in the curated dataset was generated by sampling an online encyclopedia article for the population of template text fields and using selected template parameters (e.g., layout, color, style, etc.).

In the first stage, document files are created using SmartArt templates that are filled with text extracted from an online encyclopedia (e.g., Wikipedia). To create a single infographic image, a random layout, color, style, and template are selected from a repository and a title location is selected from a predefined list of plausible locations. The placement of the infographic image template is also randomized in the document file. The text for the title and fields in the layout is then taken from an online encyclopedia article. Some layouts include the option to insert an icon image and icons selected from a library of commonly used icons can be used to populate the icon fields. In one or more embodiments, the document file is a PowerPoint presentation.

In the second stage, metadata associated with the generated document file is used to obtain properties. In one or more embodiments, the document file is first converted to the OpenXML format, which stores the data in the document file as a tree hierarchy. In one or more embodiments, each element in this tree represents a logical element from the corresponding hierarchy, and each element includes detailed information about its bounding box coordinates, other elements in the same logical group, its parent element, and its children. Referencing the infographic image 108 illustrated in FIG. 2, its OpenXML representation would include a logical element including the text in the "Title 01" and the adjacent text C08A as two constituent elements. This logical element also provides important information such as the bounding box coordinates of the previously mentioned elements, as well as their types and parent. In one or more embodiments, an OpenXML pre-order traversal can be used to assign a reading order index to each logical element of the infographic image. As a result, pre-order traversal over the associated hierarchy can be performed to obtain a structured representation of the OpenXML object suitable for the next step. A reading order of all the elements in the logical group with the iteration index at each iteration can be assigned. The following properties for each of the elements can be stored: bounding box coordinates, reading order position, and type.

As illustrated in FIG. 6, the digital design system 100 includes an input analyzer 106 that receives the training input 602. In some embodiments, the input analyzer 106 analyzes the training input 602, as shown at numeral 2. In some embodiments, the input analyzer 106 analyzes the training input 602 to identify the training infographic images 604 and ground truth visual components 606 of the training infographic images 604. In one or more embodiments, the ground truth visual components include the visual components, bounding box coordinates for each of the visual components, and the type of each of the visual components (e.g., textbox, icon, etc.).

The training infographic images 604 are then sent to component extraction module 110, as shown at numeral 3. In one or more embodiments, the component extraction module 110 is configured to extract visual components 608 from each of the training infographic images 604, at numeral 4. In one or more embodiments, the component extraction module 110 extracts the visual components 608 using an object detection model 302 to infer the bounding box coordinates of the visual components in each of the training infographic images 604. In one or more embodiments, the object detection model 302 uses a convolutional neural network (CNN) object detector. In one or more embodiments, the CNN object detector is YOLO-v5.

In After the component extraction module 110 generates the visual components 608, the visual components 608 are sent to a loss function 610, as shown at numeral 5. The ground truth visual components 606 of the training infographic images 604 is then passed to the loss function 610, as shown at numeral 6. Using the visual components 608 generated by the component extraction module 110 and the ground truth visual components 606 of the training infographic images 604, the loss function 610 can calculate a loss, at numeral 7. In one or more embodiments, the loss function 610 is a loss function used for the YOLO-v5 model. The calculated loss can then be backpropagated to the component extraction module 110 to train the object detection model 302 to infer the bounding box coordinates and component types, as shown at numeral 8.

Figure 7:
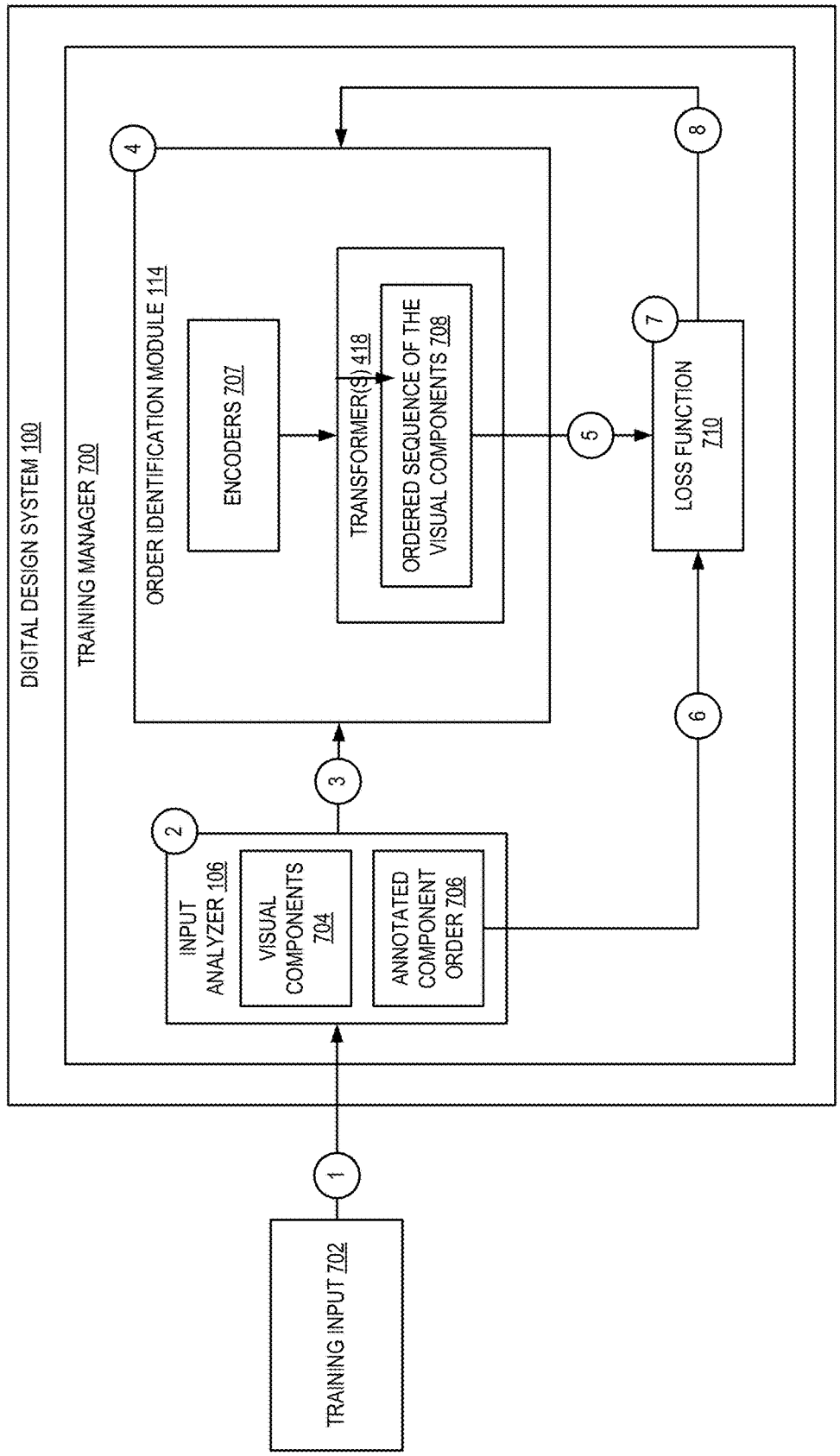
FIG. 7 illustrates a diagram of a process of training machine learning models to determine a reading order of visual components of an infographic image in accordance with one or more embodiments.

FIG. 7 illustrates a diagram of a process of training machine learning models to determine a reading order of visual components of an infographic image in accordance with one or more embodiments. In one or more embodiments, a training manager 700 is configured to train neural networks (e.g., an order identification module 114) to determine an ordered sequence of the component/elements extracted from an infographic image. In some embodiments, the training manager 700 is a part of a digital design system 100. In other embodiments, the training manager 700 can be a standalone system, or part of another system, and deployed to the digital design system 100. For example, the training manager 700 may be implemented as a separate system implemented on electronic devices separate from the electronic devices implementing digital design system 100. As shown in FIG. 7, the training manager 700 receives a training input 702, as shown at numeral 1. For example, the digital design system 100 receives the training input 702 from a user via a computing device or from a memory or storage location.

As illustrated in FIG. 7, the digital design system 100 includes an input analyzer 106 that receives the training input 702. In some embodiments, the input analyzer 106 analyzes the training input 702, as shown at numeral 2. In some embodiments, the input analyzer 106 analyzes the training input 702 to identify visual components 704 for an infographic image and an annotated component order 706 (e.g., a ground truth ordered sequence of the visual components 704) for the same infographic image. In one or more embodiments, the visual components 704 for the infographic image can be the ground truth visual components of an infographic image. In other embodiments, the visual components 704 can be components inferred by component extraction module 110, as described with respect to FIG. 3. In such embodiments, training using the visual components inferred by the component extraction module 110 rather than the ground truth visual components optimizes the order identification module 114 to handle data from the component extraction module 110 that may include errors.

In one or more embodiments, the lists of the visual components 704 can be represented as $\mathcal{L} = x_1, x_2, \ldots, x_n$, where for each visual component, $x_i$, the following information is available: the text of the visual component (e.g., extracted using optical character recognition) and its bounding box coordinates (e.g., extracted by the component extraction module 110). The visual components 704 are then sent to an order identification module 114, as shown at numeral 3. In one or more embodiments, the order identification module 114 is configured to generate a reading order of the visual components from the visual components 704, at numeral 4. In one or more embodiments, encoders 707 generate text embeddings, visual embeddings, bounding box coordinates embeddings, and position embeddings, from the visual components 704, at numeral 4. For example, the encoders 707 compute an input embedding $e_i$ for each element $x_i$. Particularly, $e_i$ is a concatenation of the text embedding for the text in $x_i$, position embedding obtained using its bounding box coordinates and the visual embedding using pretrained Resnet.

The embeddings are then passed to a transformer 418 to generate the ordered sequence of the visual components 708. After computing the input embedding for each visual component, they are passed to the transformer 418. The transformer 418 contextualizes these features using a self-attention mechanism to get another set of embeddings, which can be referred to as hidden states: $h_1, h_2, \ldots, h_n$. While the input embedding $e_i$ represents only the information included in a visual component which accounts for the information included in its neighboring elements, the hidden state models the interaction $e_i$ with other elements in $\mathcal{L}$ and derives a context aware embedding $h_i$.

To generate the correct reading order indices for the elements in $\mathcal{L}$, a decoder infers the ordered sequence of the visual components 708 in an autoregressive manner. That is, the decoder infers the reading order index associated with the first element $x_1$, and then predicts the order for the next element. This sequential prediction continues until the end of the sequence is reached. The order identification module 114 models the probability that the element $x_k$ has reading order index $\alpha$ given the information associated with the previous elements, as follows:

$$P(x_k = \alpha \mid x_{<k}) = \frac{\exp e_\alpha^T h_k + b_k}{\sum_j \exp e_j^T h_k + b_k}$$

Where $b_k$ denotes the bias vector associated at the $k^{th}$ decoding step.

After the order identification module 114 generates the ordered sequence of the visual components 708, the ordered sequence of the visual components 708 are sent to a loss function 710, as shown at numeral 5. The annotated component order 706 is then passed to the loss function 710, as shown at numeral 6. Using the ordered sequence of the visual components 708 generated by the order identification module 114 and the annotated component order 706, the loss function 710 can calculate a loss, at numeral 7. In one or more embodiments, the order identification module 114 is trained by maximizing the probability of observing the correct reading order for each element in $\mathcal{L}$. In the training dataset, the annotated component order 706 provides the correct reading order for each element in $\mathcal{L}$. Let that ordering list be denoted by $l_1, l_2, \ldots, l_n$. Then to train the model, we simply maximize the following expression:

$$\prod_{k \in \{1, 2, \ldots n\}} P(x_k = l_k \mid x_{<k})$$

Or equivalently, we minimize the following loss function:

$$\text{Loss function} = -\sum_{k=1}^{n} \log P(x_k = l_k \mid x_{<k})$$

The calculated loss can then be backpropagated to train the order identification module 114, as shown at numeral 8.

Figure 8:
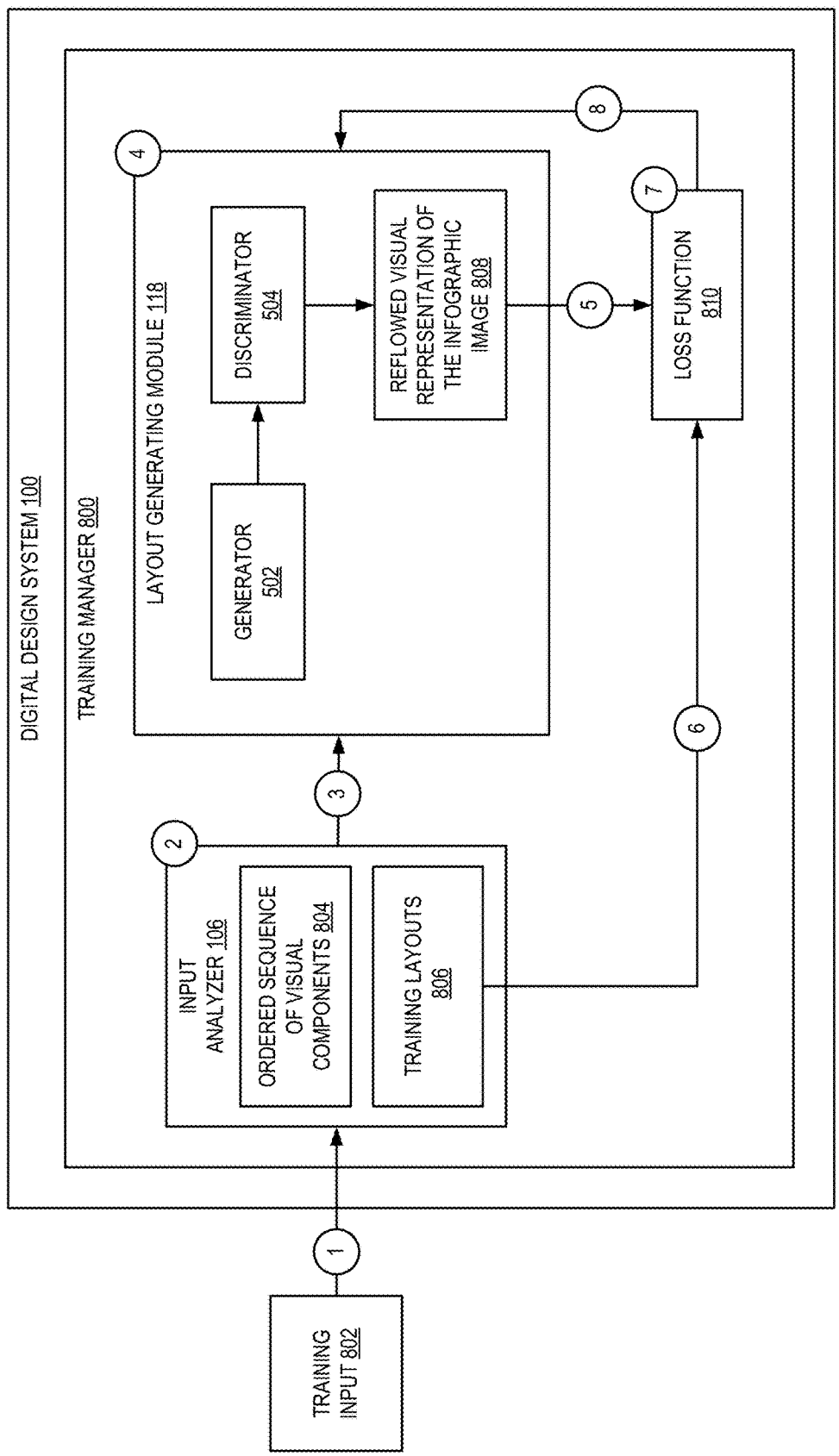
FIG. 8 illustrates a diagram of a process of training machine learning models to generate a layout of the ordered sequence of visual components in accordance with one or more embodiments.

FIG. 8 illustrates a diagram of a process of training machine learning models to generate a layout of the ordered sequence of visual components in accordance with one or more embodiments. In one or more embodiments, a training manager 800 is configured to train neural networks (e.g., a layout generating module 118) to generate a layout of the ordered sequence of visual components extracted from an infographic image. In some embodiments, the training manager 800 is a part of a digital design system 100. In other embodiments, the training manager 800 can be a standalone system, or part of another system, and deployed to the digital design system 100. For example, the training manager 800 may be implemented as a separate system implemented on electronic devices separate from the electronic devices implementing digital design system 100.

To train the layout generating module 118, a discriminator 504 is used to distinguish between the reflowed visual representation of the infographic image 808 obtained from the generator 502 and training layouts 806 in the training input 802. The idea is to get access to a model that can distinguish the ground truth training layouts 806 from layouts generated by the layout generating module 118 (e.g., so that the generator 502 can learn how to fool the discriminator 504). Thus, in the training process, model parameters for the generator 502 and discriminator 504 are updated in a cyclic fashion with the generator 502 trying to fool the discriminator 504 and the discriminator 504 trying to distinguish the generated layouts from the updated generator 502 and the training layouts 806. Once the generator 502 has learned to fool the discriminator 504, there are two ways to use the generator 502.

As shown in FIG. 8, the training manager 800 receives a training input 802, as shown at numeral 1. For example, the digital design system 100 receives the training input 802 from a user via a computing device or from a memory or storage location. The digital design system 100 includes an input analyzer 106 that receives the training input 802. In some embodiments, the input analyzer 106 analyzes the training input 802, as shown at numeral 2. In some embodiments, the input analyzer 106 analyzes the training input 802 to identify ordered sequence of visual components 804 for an infographic image and training layouts 806 (e.g., ground truth layouts).

The ordered sequence of visual components 804 is then sent to layout generating module 118, as shown at numeral 3. In one or more embodiments, the layout generating module 118 is configured to generate a reflowed visual representation of the infographic image 808, or layout, using the ordered sequence of visual components 804, at numeral 4, as described with respect to FIG. 5.

After the layout generating module 118 generates the reflowed visual representation of the infographic image 808, the reflowed visual representation of the infographic image 808 is sent to a loss function 810, as shown at numeral 5. The training layouts 806 are then passed to the loss function 810, as shown at numeral 6. Using the reflowed visual representation of the infographic image 808 generated by layout generating module 118 and the training layouts 806 (e.g., ground truth layouts), the loss function 810 can calculate a loss, at numeral 7.

For the loss functions, the $\mathcal{D}$ function is used where $\mathcal{D}(I)$ is the probability that the layout, I, is real. The discriminator 504 tries to maximize the probability of real image I and minimize the probability of generated image $\mathcal{G}(z)$, where z is a noise vector sampled from the Gaussian distribution). The objective for the discriminator 504 is to maximize:

$$\log \mathcal{D}(I) - \log \mathcal{D}(\mathcal{G}(z))$$

On the other hand, the generator 502 tries to maximize the probability that its generated layout (e.g., reflowed visual representation of the infographic image 808) is identified as real by $\mathcal{D}$. The objective for the discriminator 504 is to maximize:

$$\log \mathcal{D}(\mathcal{G}(z))$$

The calculated loss can then be backpropagated to train the layout generating module 118, as shown at numeral 8.

Figure 9:
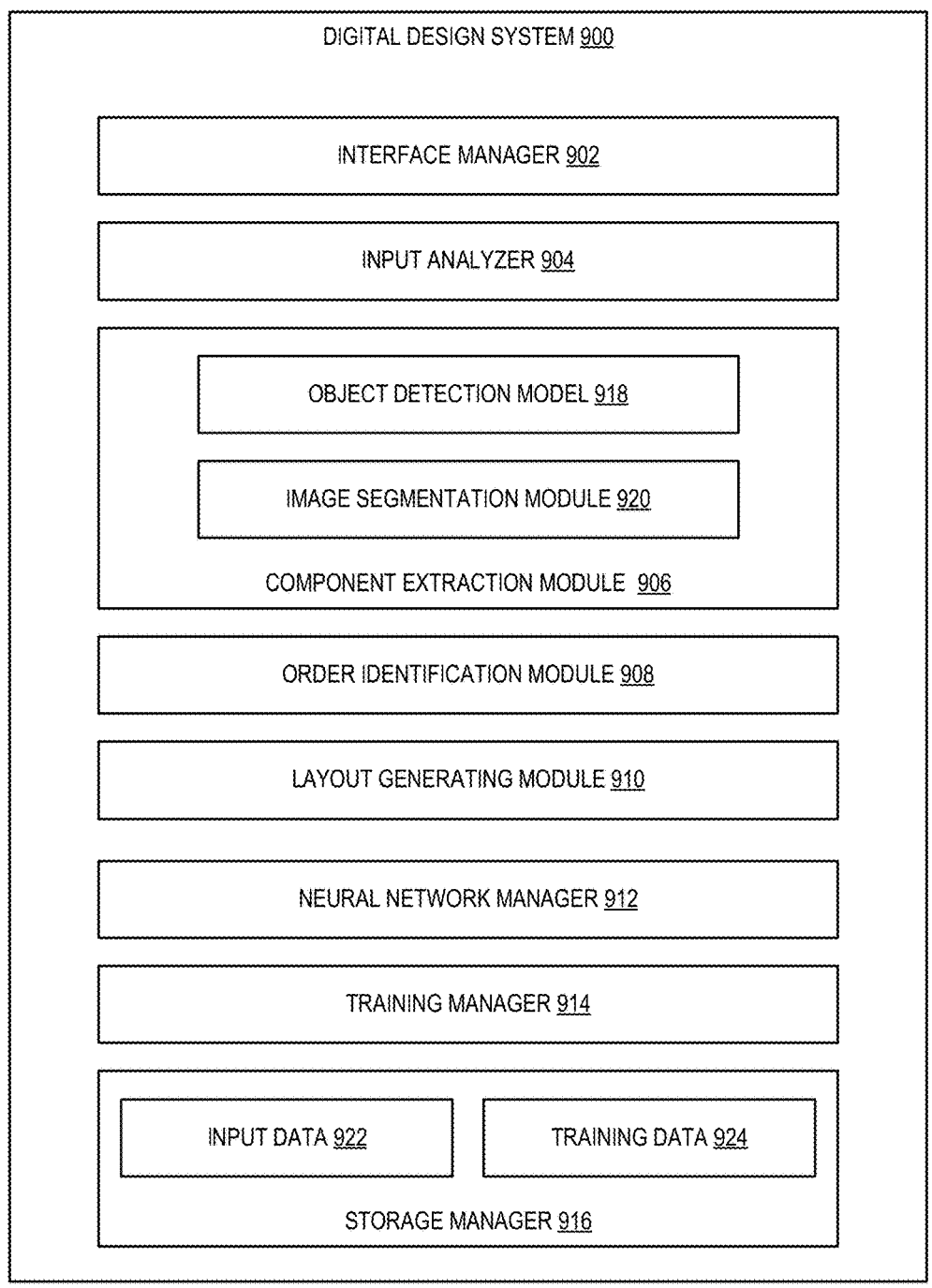
FIG. 9 illustrates a schematic diagram of a digital design system in accordance with one or more embodiments.

FIG. 9 illustrates a schematic diagram of a digital design system (e.g., "digital design system" described above) in accordance with one or more embodiments. As shown, the digital design system 900 may include, but is not limited to, an interface manager 902, an input analyzer 904, a component extraction module 906, an order identification module 908, a layout generating module 910, a neural network manager 912, a training manager 914, and a storage manager 916. The component extraction module 906 include an object detection model 918 and an image segmentation module 920. The storage manager 916 includes input data 922 and training data 924.

As illustrated in FIG. 9, the digital design system 900 includes the interface manager 902. For example, the interface manager 902 allows users to provide an input, including a document including one or more infographic images, to the digital design system 900. In some embodiments, the interface manager 902 provides a user interface through which the user can upload a document. Alternatively, or additionally, the user interface may enable the user to download the document from a local or remote storage location (e.g., by providing an address (e.g., a URL or other endpoint) associated with a document source). Additionally, the interface manager 902 allows users to request the digital design system 900 to perform operations to reflow an infographic included in the document for display in a user device (e.g., a mobile device, tablet device, etc.) where presentation of the original version of the infographic would result in a poor presentation due to size, format, and/or orientation.

As further illustrated in FIG. 9, the digital design system 900 also includes the input analyzer 904. The input analyzer 904 analyzes an input received by the digital design system 900 to identify documents and infographic images in the documents.

As further illustrated in FIG. 9, the digital design system 900 also includes the component extraction module 906. The component extraction module 906 is configured to extract visual components from an input infographic image 108 via a two-stage process. The first stage uses a convolutional neural network (CNN) object detection model 918 to infer the bounding box coordinates of the elements in the input infographic image. These bounding box coordinate are typically rectangular in shape, whereas components may have non-rectangular shapes. To address this, in one or more embodiments, the second stage uses an image segmentation module 920 to determine the objects in the infographic image, including characters, numbers, image shapes, icon shapes, etc., which may not have rectangular boundaries, for each of the inferred bounding box coordinates identified by the object detection model 918.

As further illustrated in FIG. 9, the digital design system 900 also includes the order identification module 908 configured to reconstruct the reading order of the visual components of the infographic image to generate an ordered sequence of the visual components. In one or more embodiments, the order identification module 114 is a multi-modal transformer.

As further illustrated in FIG. 9, the digital design system 900 also includes the layout generating module 910. The layout generating module 910 is configured to generate a reflowed visual representation of the infographic image. In one or more embodiments, the layout generating module 910 utilizes a data-driven generative model to generate plausible layouts for the ordered sequence of visual components generated by the order identification module 908. In other embodiments, the layout generating module 910 utilizes heuristics to arrange the visual components into a plausible arrangement for display on a user device (e.g., a mobile device).

As illustrated in FIG. 9, the digital design system 900 also includes a neural network manager 912. Neural network manager 912 may host a plurality of neural networks or other machine learning models, such as object detection model 918 of the component extraction module 906, the multi-modal transformer of the order identification module 908, and the generative model of the layout generating module 910. The neural network manager 912 may include an execution environment, libraries, and/or any other data needed to execute the machine learning models. In some embodiments, the neural network manager 912 may be associated with dedicated software and/or hardware resources to execute the machine learning models. Although depicted in FIG. 9 as being hosted by a single neural network manager 912, in various embodiments the neural networks may be hosted in multiple neural network managers and/or as part of different components. For example, each of the neural networks can be hosted by their own neural network manager, or other host environment, in which the respective neural networks execute, or the neural network models may be spread across multiple neural network managers depending on, e.g., the resource requirements of each neural network model, etc.

As illustrated in FIG. 9 the digital design system 900 also includes training manager 914. The training manager 914 can teach, guide, tune, and/or train one or more neural networks. In particular, the training manager 914 can train a neural network based on a plurality of training data. Additionally, the neural networks may be further optimized using loss functions, as discussed above, by backpropagating calculated losses. More specifically, the training manager 914 can access, identify, generate, create, and/or determine training input and utilize the training input to train and fine-tune a neural network.

As illustrated in FIG. 9, the digital design system 900 also includes the storage manager 916. The storage manager 916 maintains data for the digital design system 900. The storage manager 916 can maintain data of any type, size, or kind as necessary to perform the functions of the digital design system 900. The storage manager 916, as shown in FIG. 9, includes input data 922. The input data 922 can include documents and infographic images for performing the reflowing of the infographic images for optimized display depending on device type (e.g., mobile devices), as discussed in additional detail above. The storage manager 916, as shown in FIG. 9, also includes the training data 924. The training data 924 can include training infographic images for training the component extraction module 906 and extracted visual components for training the order identification module 908.

Each of the components 902-916 of the digital design system 900 and their corresponding elements (as shown in FIG. 9) may be in communication with one another using any suitable communication technologies. It will be recognized that although components 902-916 and their corresponding elements are shown to be separate in FIG. 9, any of components 902-916 and their corresponding elements may be combined into fewer components, such as into a single facility or module, divided into more components, or configured into different components as may serve a particular embodiment.

The components 902-916 and their corresponding elements can comprise software, hardware, or both. For example, the components 902-916 and their corresponding elements can comprise one or more instructions stored on a computer-readable storage medium and executable by processors of one or more computing devices. When executed by the one or more processors, the computer-executable instructions of the digital design system 900 can cause a client device and/or a server device to perform the methods described herein. Alternatively, the components 902-916 and their corresponding elements can comprise hardware, such as a special purpose processing device to perform a certain function or group of functions. Additionally, the components 902-916 and their corresponding elements can comprise a combination of computer-executable instructions and hardware.

Furthermore, the components 902-916 of the digital design system 900 may, for example, be implemented as one or more stand-alone applications, as one or more modules of an application, as one or more plug-ins, as one or more library functions or functions that may be called by other applications, and/or as a cloud-computing model. Thus, the components 902-916 of the digital design system 900 may be implemented as a stand-alone application, such as a desktop or mobile application. Furthermore, the components 902-916 of the digital design system 900 may be implemented as one or more web-based applications hosted on a remote server. Alternatively, or additionally, the components of the digital design system 900 may be implemented in a suite of mobile device applications or "apps."

As shown, the digital design system 900 can be implemented as a single system. In other embodiments, the digital design system 900 can be implemented in whole, or in part, across multiple systems. For example, one or more functions of the digital design system 900 can be performed by one or more servers, and one or more functions of the digital design system 900 can be performed by one or more client devices. The one or more servers and/or one or more client devices may generate, store, receive, and transmit any type of data used by the digital design system 900, as described herein.

In one implementation, the one or more client devices can include or implement at least a portion of the digital design system 900. In other implementations, the one or more servers can include or implement at least a portion of the digital design system 900. For instance, the digital design system 900 can include an application running on the one or more servers or a portion of the digital design system 900 can be downloaded from the one or more servers. Additionally, or alternatively, the digital design system 900 can include a web hosting application that allows the client device(s) to interact with content hosted at the one or more server(s).

For example, upon a client device accessing a webpage or other web application hosted at the one or more servers, in one or more embodiments, the one or more servers can provide a user of the client device with an interface to provide inputs, including documents that include infographic images. Upon receiving the inputs, the one or more servers can automatically perform the methods and processes described above to perform operations on the input infographic image to reflow the infographic image for cross-device display.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

Figure 10:
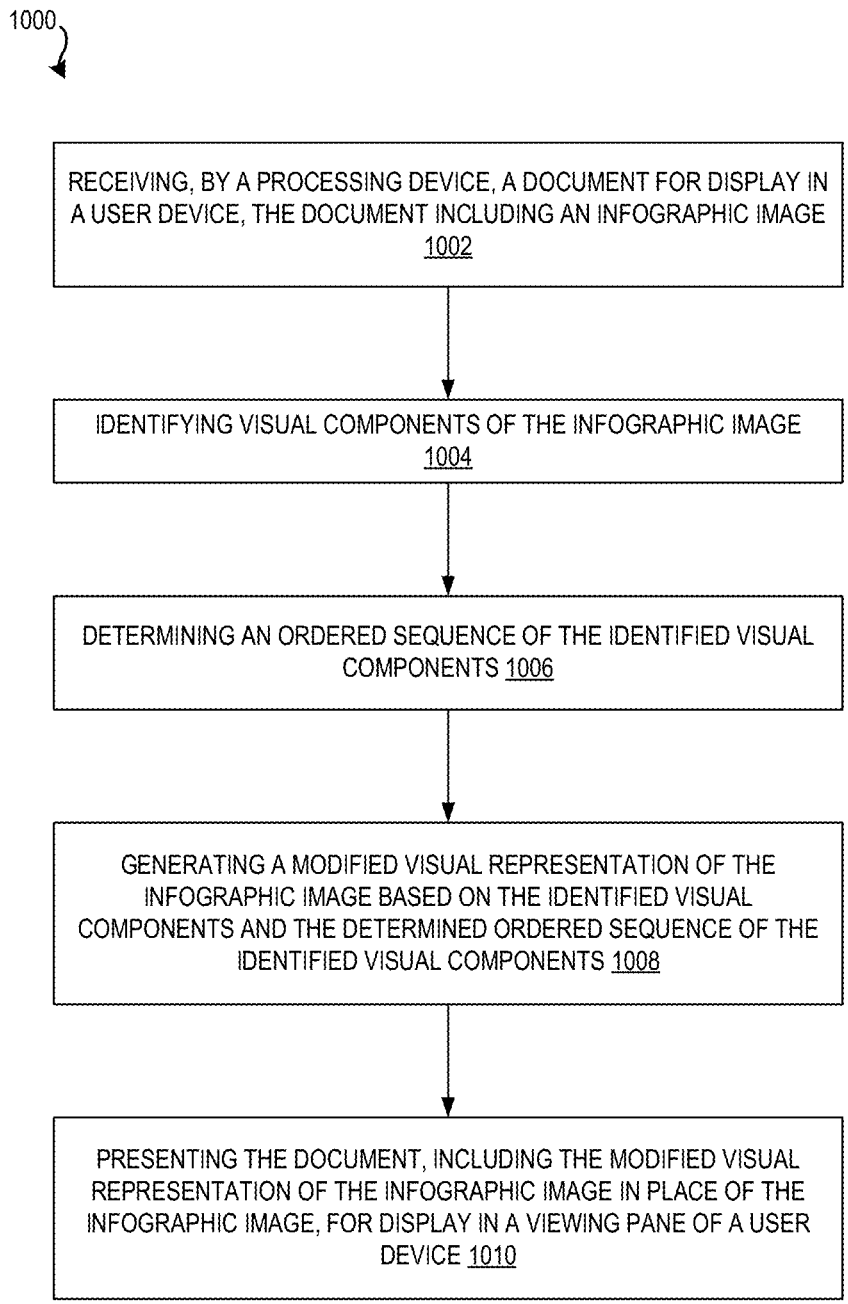
FIG. 10 illustrates a flowchart of a series of acts in a method of reflowing an infographic image to optimize the display of the infographic image in a device in accordance with one or more embodiments.

FIGS. 1-9, the corresponding text, and the examples, provide a number of different systems and devices to allow a digital design system to reflow an infographic image for cross-device display. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method of reflowing an infographic image to optimize the display of the infographic image in a device in accordance with one or more embodiments. In one or more embodiments, the method 1000 is performed in a digital medium environment that includes the digital design system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving, by a processing device, a document for display in a user device, the document including an infographic image. In one or more embodiments, the digital design system receives the document from a user (e.g., via a computing device). In one or more embodiments, the user may select a document in an application, or the user may submit the document to a web service or an application configured to receive inputs. The document includes an infographic image. In one or more embodiments, instead of a document that includes an infographic image, the input can be the infographic image alone.

As illustrated in FIG. 10, the method 1000 includes an act 1004 of identifying, using a convolutional neural network, visual components of the infographic image. In one or more embodiments, the visual components are identified using a two stage process. In the first stage, the convolutional neural network is part of an object detection model that generates bounding boxes (e.g., rectangular bounding boxes) corresponding to candidate elements of the infographic image. In one or more embodiments, the candidate elements include a title element, text boxes, and icons. In the second stage, an image segmentation algorithm is used to identify visually important regions, or candidate regions, of the infographic image. The image segmentation algorithm can identify regions that are irregularly shaped, such as the shapes of characters in the title element or text boxes and the shapes of objects (e.g., icons, text boxes, etc.). After identifying the candidate elements and the candidate regions, the processing device, identifies a candidate region identified by the image segmentation algorithm that maximally overlaps with one or more of the candidate elements. The identified candidate region is then identified as a visual component of the infographic image.

As illustrated in FIG. 10, the method 1000 includes an act 1006 of determining, using an encoder-decoder network, an ordered sequence of the identified visual components. In one or more embodiments, a plurality of encoders generate feature embeddings using the identified visual components. For example, a visual encoder generates visual embeddings/features for the identified visual components, a text encoder generates text embeddings/features using the text identified in the visual components, a coordinates encoder generates bounding box coordinates embeddings/features, and a position encoder generates position embeddings/features. The generated feature embeddings are then concatenated and provided to a transformer. The transformer generates sequence indices for each of the identified visual components of the infographic image representing the ordered sequence of the identified visual components, based on the concatenated feature embeddings and the coordinates for the identified visual components and the candidate elements of the infographic image.

As illustrated in FIG. 10, the method 1000 includes an act 1008 of generating, using a generative adversarial network, a modified visual representation of the infographic image based on the identified visual components and the determined ordered sequence of the identified visual components. In one or more embodiments, the generative adversarial network is part of a layout generating module. The layout generating module receives coordinates for the identified visual components and the determined ordered sequence of the identified visual components. The layout generating module generates one or more candidate layouts for the modified visual representation of the infographic image based on the identified visual components, the determined ordered sequence of the identified visual components, and a set of constraints. The set of constraints can include alignment constraints, non-overlap constraints, relational constraints, and reading order constraints. In one or more embodiments, the constraints can further include the specifications for the device (e.g., mobile device) viewing the document. Once generated, the processing device can provide the one or more candidate layouts (e.g., as an output to a device or in a display on the device).

As illustrated in FIG. 10, the method 1000 includes an act 1010 of presenting the document, including the modified visual representation of the infographic image in place of the infographic image, for display in a viewing pane of a user device. The replacement of the infographic image with the modified visual representation of the infographic image allows for the information presented in the infographic image to be legible to a user when viewed on the user device without the need for the user to zoom in, zoom out, and/or pane across the modified visual representation of the infographic image. In some embodiments, the display of the modified visual representation of the infographic image is based on the dimensions and size of the viewing pane of the user device. For example, the modified visual representation of the infographic image can be resized to fit the width of the viewing pane of the user device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
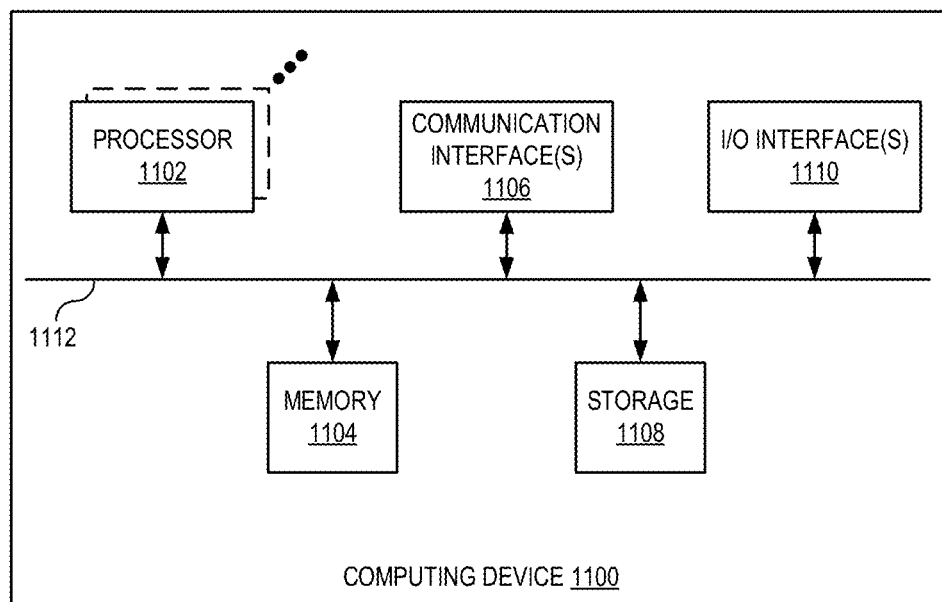
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the digital design system 900. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving, by a processing device, a document for display in a user device, the document including an infographic image;
   identifying, using a component extraction module, visual components of the infographic image, wherein the component extraction module includes an object detection model that generates bounding box data for candidate elements in the infographic image and an image segmentation algorithm that analyzes pixels of the infographic image to identify candidate regions of the infographic image, and
   wherein for each candidate region of the candidate regions:
      determining a candidate region maximally overlapping with one or more of the candidate elements of the infographic image, and
      identifying the candidate region as a visual component of the infographic image;
   determining, using an encoder-decoder network, an ordered sequence of the identified visual components;
   rendering a modified visual representation of the infographic image based on the identified visual components and the determined ordered sequence of the identified visual components; and
   presenting the document, including the modified visual representation of the infographic image in place of the infographic image, for display in a viewing pane of a user device, wherein the modified visual representation of the infographic image is resized to fit a width of the viewing pane of the user device.

2. The method of claim 1, wherein identifying the candidate regions of the infographic image comprises:
   segmenting the infographic image into a number of components equal to a number of pixels in the infographic image; and
   iteratively merging components when a distance between a first component and a second component of a pair of components is less than a minimum of an internal distance of each of the first component and the second component.

3. The method of claim 1, wherein determining the ordered sequence of the identified visual components comprises:
   generating, by encoders, feature embeddings for the identified visual components;
   concatenating the generated feature embeddings;
   receiving, by a transformer, the concatenated feature embeddings and coordinates for the identified visual components and the candidate elements of the infographic image; and
   generating sequence indices for each of the identified visual components of the infographic image based on the concatenated feature embeddings and the coordinates for the identified visual components and the candidate elements of the infographic image.

4. The method of claim 1, wherein rendering the modified visual representation of the infographic image based on the identified visual components and the determined ordered sequence of the identified visual components comprises:
   generating, using heuristics, a candidate layout for the modified visual representation of the infographic image by placing the identified visual components into a layout template based on the determined ordered sequence of the identified visual components.

5. The method of claim 1, wherein rendering the modified visual representation of the infographic image based on the identified visual components and the determined ordered sequence of the identified visual components comprises:
   providing, to a generative adversarial network, coordinates for the identified visual components and the determined ordered sequence of the identified visual components;
   generating, by the generative adversarial network, one or more candidate layouts for the modified visual representation of the infographic image based on the identified visual components, the determined ordered sequence of the identified visual components, and a set of constraints; and
   providing the one or more candidate layouts.

6. The method of claim 5, wherein the set of constraints include alignment constraint, non-overlap constraint, relational constraint, and a reading order constraint.

7. The method of claim 1, wherein rendering the modified visual representation of the infographic image based on the identified visual components and the determined ordered sequence of the identified visual components comprises:
   vertically distributing the identified visual components based on the determined ordered sequence.

8. A non-transitory computer-readable medium storing executable instructions, which when executed by a processing device, cause the processing device to perform operations comprising:
   receiving, by a processing device, a document for display in a user device, the document including an infographic image;
   identifying, using a component extraction module, visual components of the infographic image, wherein the component extraction module includes an object detection model that generates bounding box data and object type data for candidate elements in the infographic image and an image segmentation algorithm that analyzes pixels of the infographic image to identify candidate regions of the infographic image;

determining, using an encoder-decoder network, an ordered sequence of the identified visual components;

rendering a modified visual representation of the infographic image based on the identified visual components and the determined ordered sequence of the identified visual components; and presenting the document, including the modified visual representation of the infographic image in place of the infographic image, for display in a viewing pane of a user device, wherein the modified visual representation of the infographic image is resized to fit a width of the viewing pane of the user device.

9. The non-transitory computer-readable medium of claim 8, wherein the instructions to identify the candidate regions of the infographic image further cause the processing device to perform operations comprising:

segmenting the infographic image into a number of components equal to a number of pixels in the infographic image; and iteratively merging components when a distance between a first component and a second component of a pair of components is less than a minimum of an internal distance of each of the first component and the second component.

10. The non-transitory computer-readable medium of claim 8, wherein the instructions to determine the ordered sequence of the identified visual components further cause the processing device to perform operations comprising:

generating, by encoders, feature embeddings for the identified visual components;

concatenating the generated feature embeddings;

receiving, by a transformer, the concatenated feature embeddings and coordinates for the identified visual components and the candidate elements of the infographic image; and generating sequence indices for each of the identified visual components of the infographic image based on the concatenated feature embeddings and the coordinates for the identified visual components and the candidate elements of the infographic image.

11. The non-transitory computer-readable medium of claim 8, wherein the instructions to render the modified visual representation of the infographic image based on the identified visual components and the determined ordered sequence of the identified visual components further cause the processing device to perform operations comprising:

generating, using heuristics, a candidate layout for the modified visual representation of the infographic image by placing the identified visual components into a layout template based on the determined ordered sequence of the identified visual components.

12. The non-transitory computer-readable medium of claim 8, wherein the instructions to render the modified visual representation of the infographic image based on the identified visual components and the determined ordered sequence of the identified visual components further cause the processing device to perform operations comprising:

providing, to a generative adversarial network, coordinates for the identified visual components and the determined ordered sequence of the identified visual components;

generating, by the generative adversarial network, one or more candidate layouts for the modified visual representation of the infographic image based on the identified visual components, the determined ordered sequence of the identified visual components, and a set of constraints; and providing the one or more candidate layouts.

13. The non-transitory computer-readable medium of claim 12, wherein the set of constraints include alignment constraints, non-overlap constraints, relational constraints, and a reading order constraint.

14. The non-transitory computer-readable medium of claim 8, wherein the instructions to render the modified visual representation of the infographic image based on the identified visual components and the determined ordered sequence of the identified visual components further cause the processing device to perform operations comprising:

vertically distributing the identified visual components based on the determined ordered sequence.

15. A system comprising:

a memory component; and a processing device coupled to the memory component, the processing device to perform operations comprising:

receiving, by a processing device, a document for display in a user device, the document including an infographic image;

identifying, using a component extraction module, visual components of the infographic image, wherein the component extraction module includes an object detection model that generates bounding box data and object type data for candidate elements in the infographic image and an image segmentation algorithm that analyzes pixels of the infographic image to identify candidate regions of the infographic image;

determining, using an encoder-decoder network, an ordered sequence of the identified visual components;

rendering a modified visual representation of the infographic image based on the identified visual components and the determined ordered sequence of the identified visual components; and presenting the document, including the modified visual representation of the infographic image in place of the infographic image, for display in a viewing pane of a user device, wherein the modified visual representation of the infographic image is resized to fit a width of the viewing pane of the user device.

16. The system of claim 15, wherein the operations of identifying the candidate regions of the infographic image comprises:

segmenting the infographic image into a number of components equal to a number of pixels in the infographic image; and iteratively merging components when a distance between a first component and a second component of a pair of components is less than a minimum of an internal distance of each of the first component and the second component.

17. The system of claim 15, wherein the operations of determining the ordered sequence of the identified visual components comprises:

generating, by encoders, feature embeddings for the identified visual components;

concatenating the generated feature embeddings;

receiving, by a transformer, the concatenated feature embeddings and coordinates for the identified visual components and the candidate elements of the infographic image; and generating sequence indices for each of the identified visual components of the infographic image based on the concatenated feature embeddings and the coordinates for the identified visual components and the candidate elements of the infographic image.

18. The system of claim 15, wherein the operations of rendering the modified visual representation of the infographic image based on the identified visual components and the determined ordered sequence of the identified visual components comprises:

generating, using heuristics, a candidate layout for the modified visual representation of the infographic image by placing the identified visual components into a layout template based on the determined ordered sequence of the identified visual components.

19. The system of claim 15, wherein the operations of rendering the modified visual representation of the infographic image based on the identified visual components and the determined ordered sequence of the identified visual components comprises:

providing, to a generative adversarial network, coordinates for the identified visual components and the determined ordered sequence of the identified visual components;

generating, by the generative adversarial network, one or more candidate layouts for the modified visual representation of the infographic image based on the identified visual components, the determined ordered sequence of the identified visual components, and a set of constraints; and providing the one or more candidate layouts.

20. The system of claim 19, wherein the operations of rendering the modified visual representation of the infographic image based on the identified visual components and the determined ordered sequence of the identified visual components comprises:

vertically distributing the identified visual components based on the determined ordered sequence.

\* \* \* \* \*